United States Patent [19]

Davis et al.

[11] Patent Number: 5,496,531
[45] Date of Patent: Mar. 5, 1996

[54] HIGH SURFACE PURITY HEAT TRANSFER SOLIDS FOR HIGH TEMPERATURE FLUIDIZED BED REACTIONS (ER&E CASE NO. C-2708)

[75] Inventors: Stephen M. Davis; LeRoy R. Clavenna; Geoffrey R. Say, all of Baton Rouge, La.; Rocco A. Fiato, Basking Ridge, N.J.

[73] Assignee: Exxon Research and Engineering Company, Florham Park, N.J.

[21] Appl. No.: 276,071

[22] Filed: Jul. 15, 1994

Related U.S. Application Data

[62] Division of Ser. No. 60,378, May 11, 1993, Pat. No. 5,360,778.

[51] Int. Cl.$^6$ ............... C01B 3/02; C01B 3/26; C01B 31/18
[52] U.S. Cl. .............. 423/418.2; 252/373; 423/648.1; 423/652; 423/653; 423/654
[58] Field of Search .................... 423/652, 653, 423/654, 418.2, 648.1; 252/373

[56] References Cited

U.S. PATENT DOCUMENTS

| | | | |
|---|---|---|---|
| 2,546,606 | 3/1951 | Mayland | 252/373 |
| 4,542,113 | 9/1985 | Meyer et al. | 502/355 |
| 4,888,131 | 12/1989 | Goetsch et al. | 252/373 |
| 5,143,647 | 9/1992 | Say et al. | 252/373 |
| 5,177,303 | 1/1993 | Griffiths et al. | 423/654 |

*Primary Examiner*—Wayne Langel
*Attorney, Agent, or Firm*—Llewellyn A. Proctor; Jay Simon

[57] ABSTRACT

High surface purity heat transfer solids are formed, suitably by washing and treating particulate refractory inorganic solids, notably alumina, which contains as impurities up to about 0.5 wt. % silicon and/or up to about 500 wppm boron, with an acid, or dilute acid solution sufficient to reduce the concentration of silicon and boron in the outer peripheral surface layer of the particles, e.g., as measured inwardly toward the center of a particle to a depth of about 50 Å using X-ray photoelectron spectroscopy, to no greater than about 5 atom percent silicon and boron, preferably about 2 atom percent silicon and boron, based on the total number of cations within said outer peripheral surface layer, thereby reducing the tendency of said particles to sinter and agglomerate in the conversion of said hydrocarbon to hydrogen and carbon monoxide in a fluidized bed synthesis gas operation vis-a-vis particles otherwise similar except that the particles are not treated with the acid. The tendency of the particles to sinter and agglomerate is further reduced by the additional removal of sodium, iron, calcium, and titanium impurities from the outer peripheral surface layer of the particles. Preferably the latter named impurities, or impurities other than silicon and boron, are reduced to a concentration below about 20 atom %, more preferably to a concentration below about 15 atom %, in the outer surface layer of the particles.

9 Claims, No Drawings

HIGH SURFACE PURITY HEAT TRANSFER SOLIDS FOR HIGH TEMPERATURE FLUIDIZED BED REACTIONS (ER&E CASE NO. C– 2708)

This is a division of application Ser. No. 060,378, filed May 11, 1993, U.S. Pat. No. 5,360,778.

1. Field of the Invention

This invention relates to a process for producing novel heat transfer solids, and process utilizing a combination of said heat transfer solid in admixture with a catalyst, or catalysts, to provide a fluidizable contact mass useful for conducting chemical reactions at high temperature, oxidizing, reducing and hydrothermal conditions, especially synthesis gas generation. In particular, it relates to the production of high surface purity refractory inorganic oxides, notably alumina, and their use as heat transfer solids for conducting high temperature fluidized bed synthesis gas operations.

2. Background

Particulate refractory inorganic oxide solids, e.g., alumina, have been employed for many years as catalyst supports, or carriers, in natural or synthetic form. For example, synthesis gas, or syn gas (hydrogen and carbon monoxide), is produced from low molecular weight hydrocarbons, primarily methane, reacted in the presence of steam (steam reforming process) or oxygen (partial oxidation process), or both steam and oxygen, at high temperature within a fluidized bed of catalyst, e.g., nickel on an alpha alumina support. Frequently, a second catalytically active solid is present in minor amount to promote the steam reforming reaction. Suitably, particulate refractory inorganic oxide solids, notably alpha alumina solids, are admixed with the catalyst, or catalysts, of the fluidized bed as heat transfer solids to control the temperature of reaction. Processes utilizing the admixtures of catalysts and heat transfer solids in reacting low molecular weight hydrocarbons in the presence of both steam and oxygen, it has been found, have provided overall high thermal efficiencies in the production of syn gas.

Certain particulate refractory inorganic oxide solids as heat transfer materials are more resistant than others to melting and agglomeration at the severe high temperature oxidizing and reducing conditions encountered in fluidized bed syn gas generation processes. These particulate refractory inorganic oxides permit substantially isothermal reactor conditions in conducting such reactions, at least so long as they resist melting and agglomeration which leads to reduced fluidization quality, gas bubbles of increased size, and inferior mass transfer. Moreover, the mechanical strength of some particulate solids is greater than others, and in any process the particles must be sufficient to withstand the stress and strain of process operations.

Sintering and agglomeration of the fluidized bed solids have been found particularly important pathways for fluidized bed degradation, and loss of catalyst activity in fluidized bed operations. Hot spots, particularly as occurs in the zones of oxygen injection, produces sintering and agglomeration of the particles. The temperatures in these zones far exceed the normally high temperature of reaction outside these zones, often by several hundred Fahrenheit degrees. Surface melting of the particles, for any reason whatever, creates a tendency of the particles to fuse, or stick together to form agglomerates; and agglomeration of the particulate solids promotes defluidization of the bed. Particulate heat transfer solids must also be chemically compatible with the catalyst of the fluidized bed for contamination and poisoning of the catalyst cannot be tolerated. Albeit there are a few which stand out as exceptional in a relative sense, no particulate refractory oxide solid is now known which possesses the combination of properties which would render it a heat transfer solid capable of completely withstanding sintering, agglomeration and attrition to the desired degree at the extreme conditions encountered in commercial fluidized bed syn gas operations, particularly commercial fluidized bed syn gas operations at extreme hydrothermal conditions. Thus, there exists an acute need for further improving and maintaining the fluidization characteristics of the bed, or beds, employed in fluidized bed synthesis gas manufacturing processes.

3. Description of the Invention

The present invention relates to a process for preparing a heat transfer solid from particulate refractory inorganic oxide solids containing silicon, or boron, or both silicon and boron (Si+B), impurities in limited bulk concentration via treatment with an acid to reduce the concentration of the silicon and boron impurities at the surface of the particles below certain critical levels—viz., about 5 atom percent, preferably about 2 atom percent—for admixture with a catalyst to form a fluidized bed with which a low molecular weight hydrocarbon can be contacted at high temperature in the presence of steam, oxygen, or both steam and oxygen, to convert the hydrocarbon to hydrogen and carbon monoxide; and to a process utilizing this heat transfer solid in the manner stated for conducting such conversion reactions. The particulate bed heat transfer solid provides improved sintering and agglomeration resistance, and in admixture with catalysts provides excellent fluidization characteristics by suppressing agglomeration tendencies which promote bed defluidization.

In the preparation of the heat transfer solid, a refractory inorganic oxide solid(s)—preferably alkaline-earth metal oxides, aluminates, and spinels, suitably magnesia, magnesium aluminate, strontium aluminate, barium aluminate, and the like, zirconia, and more preferably alumina, especially alpha alumina—containing silicon in concentration no greater than about 0.5 percent, based on the total weight of the solids, or boron in concentration no greater than about 500 parts, per million parts by weight total solids (wppm), or both the silicon and boron, respectively, as impurities is contacted, washed or treated with an acid, or acidic solution to remove silicon, or boron, or both silicon and boron, from the outer surface layer of the particles to reduce the sum-total concentration of silicon and boron (Si+B) to a concentration of no greater than about 5 atom percent, preferably no greater than about 2 atom percent, based on the total number of cations within said outer surface of the particles. The removal of these impurities from the particles to lower the outer surface concentration of (Si+B) to these levels lowers considerably the tendency of the particles to sinter and agglomerate when employed as heat transfer solids in fluidized bed synthesis gas manufacturing operations. The tendency of the particles to sinter and agglomerate when employed as heat transfer solids in fluidized bed synthesis gas manufacturing operations is even further reduced when, additionally, the sum-total concentration of sodium and iron, as impurities, and further including as impurities, calcium and titanium where the calcium and titanium component is not a primary component of the inorganic oxide matrix constituting the bulk elemental composition of the particle is reduced below about 20 atom percent, more preferably about 15 atom percent, within the outer surface of the particles.

Impurities are herein defined are any and all of silicon, boron, sodium and iron; and further include one or more of calcium or titanium where the calcium or titanium component is not a primary component of the inorganic oxide matrix constituting the bulk elemental composition of the particle. Thus, calcium and titanium may or may not be considered impurity elements depending on the specific material investigated. For example, in high purity magnesium oxide or alumina, calcium is considered as an impurity element. On the other hand however, calcium alumina spinel materials are known which contain concentrations of calcium in the range of about 2 to 10 wt %. In such solids, the calcium is more-or-less uniformly distributed throughout the oxide matrix and the material will display characteristic features in the X-ray diffraction pattern which are indicative of the spinel structure rather than that of alpha alumina. In these materials the calcium is not an impurity. Other species which are considered deleterious and can be treated and removed from the particle surface by acid washing include phosphorous, sulfur, and chlorine.

Particulate refractory inorganic oxide solids, e.g., alpha alumina, which contain silicon in concentration greater than about 0.5 wt %, or boron in concentration greater than 500 wppm, or both silicon and boron in these high amounts concentrated throughout the bulk solids, are not useful in synthesis gas operations. All too soon these particles will sinter and agglomerate. In fact, even when the particulate solids are treated to reduce the surface level of (Si+B) to a concentration below 5 atom percent, or preferably 2 atom percent, within the outer surface of these particles, the particles will sinter and agglomerate all too soon at the conditions of a synthesis gas operation. This is because the silicon and boron cations will migrate from below the outer surface of the particles into the outer surface layer during synthesis gas operations and collect at the surface in concentrations sufficient to promote sintering and agglomeration of the particles. In contrast however, when the particles which contain silicon in concentration less than about 0.5 wt. percent, or boron in concentration less than about 500 wppm, or both silicon and boron in amounts below these levels, respectively, are treated to reduce the (Si+B) concentration to 5 atom percent or less, or to 2 atom percent or less, in the outer surface of the particle, the particulate solids will generally become highly resistant to sintering and agglomeration at synthesis gas operating conditions, and will remain highly resistant to sintering and agglomeration at synthesis gas operating conditions over long periods of time. In other words, a particulate solids specimen, e.g., alpha alumina solids, which contains silicon in concentration below about 0.5 wt. percent, boron in concentration below about 500 wppm, or both silicon and boron in these relatively low amounts, after the acid treatment is found highly resistant to sintering and agglomeration in synthesis gas operations for periods of long duration when the (Si+B) level in the outer surface is treated and reduced to 5 atom % (Si+B)/Al or less, and preferably to 2 atom % (Si+B)/Al or less. Moreover, albeit the greatest benefit is obtained by reduction of the silicon and boron levels in the outer surface of the particles, further suppression of the tendency of the particles to sinter and agglomerate is obtained by treatment of such particles to additionally reduce in the outer surface of such particles, the sum-total concentration of all of the sodium, iron, calcium, and titanium impurities to levels not exceeding about 20 atom percent, preferably to levels not exceeding about 15 atom percent.

The surface composition of the heat transfer solid particles is critical, and silicon and boron (Si+B) in concentrations greater than about 5 atom percent (and, though less acute, the presence of sodium, iron, calcium, and titanium as surface impurities at concentrations greater than about 20 atom percent) in the outer surface of the particles causes the particles to sinter and agglomerate at the conditions of synthesis gas operations. Agglomeration occurs all too quickly whether the surface contaminated heat transfer solid particles are added ab initio to the fluidized bed of the synthesis gas reactor, or agglomerated at synthesis gas operating conditions as a result of the transport of bulk impurities from the interior of the particles to the outer surface where the particulate solids contain excessive amounts of these elements as bulk impurities. It has been found, however, that reduction of the sum-total concentration of these impurities from the outer surface of the particles, suitably as measured from the outer peripheral surface of a particle inwardly (toward its center) to a depth of about 50 Angstrom units, Å, using X-ray photoelectron spectroscopy (XPS), e.g., (Si+B) to less than about 5 atom percent, and sodium, iron, calcium and titanium to less than 20 atom percent, suppresses the tendency of the particles to sinter and agglomerate when employed in synthesis gas operations. In the XPS technique, the surface of the particles is bombarded with X-rays produced using an aluminum anode maintained at a potential of about 10 kilovolts. The X-rays induce the emission of electrons from the outer surface of the particles, and the energy distribution of the emitted electrons is characteristic of the elements present in the outer surface of the particle. Integration of the photoelectron peaks gives a quantitative elemental analysis of the outermost surfaces of the particles i.e., from the peripheral surface of a particle inwardly to a distance of about 50 Å, as measured by XPS.

The preferred starting materials for the practice of this invention are particulate refractory inorganic oxides, generally low cost fused and/or tabular type oxides, contaminated, apparently ubiquitously in commercially produced ceramic oxide powders, by silicon, or boron, or both silicon and boron, and one or more of sodium and iron, as impurities, or additionally calcium and titanium where the calcium and titanium component is not a primary component of the inorganic oxide matrix constituting the bulk elemental composition of the particle. The mean average diameter of the particles generally ranges from about 30 microns to about 150 microns, preferably from about 60 microns to about 90 microns. The particles can be produced, e.g., by spray drying or by grinding and classifying suitable bodies of the oxide. The particulate refractory inorganic solids are contacted, or washed with an acid sufficient to remove the impurities, or contaminants, from the surface of the solids without significantly altering the bulk structure, morphology, or particle size distribution and without dissolving significant amounts of the solids during the treatment. Preferably also the acid is one which will not form a residue, or introduce other contaminants. Acids suitable for dissolving out the impurities without significant reaction with the solids particles, or formation of a residue, are certain of the mineral and organic acids which can be generally characterized by a $pK_a$ (minus the logarithm of the acid dissociation constant) of about 4 or less. Such acids include such mineral acids as nitric acid, nitrous acid, sulfuric acid, and the like, carboxylic acids, e.g., formic acid, acetic acid, citric acid, and the like, and including polycarboxylic acids, e.g., oxalic acid and the like, hydroxycarboxylic acids, e.g., lactic acid and the like, fluorosubstituted carboxylic acids, e.g., trifluoroacetic acid, and the like, amino acids, e.g., ethylenediaminotetracetic acid (EDTA) and the like, sulfonic acids and substituted sulfonic acids, e.g., trifluoromethanesulfonic acid and the like. Suitably, the acids are used in an aqueous medium in dilute concentrations providing from about 0.01 molar to about 2 molar, preferably from about 0.05 molar to about 1 molar, solutions. Nitric acid of about 0.05 to 1 molarity is preferred, most preferably from about 0.1 to about 0.6 molarity. Generally, treatment of the solids, e.g., particulate alpha alumina, with a dilute aqueous acid solution, e.g., a 0.1 molar nitric acid solution, over a period ranging from about 0.05 hour to about 2 hours, generally from about 0.1 hour to about 0.5 hours, will reduce the silicon and boron content in the outer peripheral surface of the particulate alpha alumina (e.g., as measured by XPS from the outer peripheral surface inwardly to a depth of 50 Å) below about 5 atom percent [i.e., (Si+B)/Al], generally below about 2 atom percent, and the concentrations of sodium, iron, calcium, and titanium (relative to aluminum) below about 20 atom percent, generally below about 15 atom percent. Acids of higher concentrations, particularly when the treatment is made at above ambient temperature, increases the rate of impurity extraction. This treatment however can result in partial dissolution, or degradation of the particles which is undesirable.

Surface composition data for the acid treated particulate oxide solids have consistently shown that the reduced concentrations of these impurities, particularly silicon and boron, in the surface region of the particles reduces greatly the tendency of the treated particles to sinter and agglomerate when subjected to synthesis gas operating conditions vis-a-vis particles otherwise similar except they are untreated and are subjected to similar synthesis gas operating conditions. Whereas the exact mechanism for this phenomenon is unknown it is believed that these surface impurities form, or contribute to the formation of, surface compounds which exhibit reduced melting points relative to that of the particulate oxide solid, or solids, that are free of the surface impurities.

After acid treatment the particulate refractory inorganic oxide is collected, suitably, e.g., by filtration or other separation method, dried, and preferably calcined in air at temperatures ranging from about 400° C. to about 1400° C., and higher preferably from about 400° C. to about 800° C., prior to use. Calcination generally decomposes and desorbes residues, if any, such as nitrate or sulfate which, if not removed, may adversely affect process hardware.

In a particularly preferred embodiment, the present invention is one comprising an admixture of, as a heat transfer component, the acid treated particulate refractory inorganic oxides and a catalyst, the average particle diameter of both the heat transfer component and the catalyst ranging from about 30 microns to about 150 microns, preferably from about 60 microns to about 90 microns. The catalyst is constituted of a support, or carrier, notably a refractory inorganic oxide, particularly alumina, with which is composited a metal, or metals, e.g., nickel, platinum, ruthenium or the like, catalytic for the production of hydrogen and carbon monoxide from low molecular weight hydrocarbons contacted with a fluidized bed of the catalyst at high temperature hydrothermal conditions. Suitably the catalyst is a nickel-on-alumina catalyst, and preferably a nickel-on-alpha alumina catalyst, of particle size distributions corresponding to that of the heat transfer component. An admixture constituted of from about 10 percent to about 99.9 percent preferably from about 80 percent to about 99.5%, of said particulate heat transfer solid, and from about 0.1 percent to about 90 percent, preferably from about 0.5 percent to about 20 percent, of the catalyst, based on the total weight of the admixture (dry basis), can be fluidized at temperatures ranging to about 2600° F. (1426° C.), particularly at temperatures ranging between about 1600° F. (871° C.) and 2000° F. (1093° C.), and contacted with a low molecular weight hydrocarbon, e.g., $C_1$–$C_4$ alkanes, predominantly methane, in the presence of steam, or oxygen (air), or both steam and oxygen (air), to produce syn gas without significant sintering of the particulate solids components of the admixture. Likewise, there is no significant disintegration of either component of the admixture to fines, or degradation of the particles of the admixture to produce agglomerates. In short, the heat transfer solids are highly resistant to sintering, attrition and agglomeration per se, and impart high resistance to sintering and agglomeration of the catalyst.

The catalyst component of the fluidized bed contains preferably from about 1 percent to about 20 percent nickel, more preferably from about 5 percent to about 10 percent nickel, composited with an alumina support, preferably an alpha alumina support. The mean average diameter of the catalyst particles ranges from about 30 microns to about 150 microns, preferably from about 60 microns to about 90 microns; particles of size distribution which can be readily fluidized along with the particulate heat transfer solids and contacted, e.g., with a light hydrocarbon feed, $C_1$–$C_4$ alkanes, predominantly methane and steam, or methane and an oxygen-containing gas (air), or methane and both steam and oxygen, at elevated temperature sufficient to convert the hydrocarbon feed to syn gas without significant degradation of the particles of the bed to fines, sintering, or catalyst agglomeration.

The invention will be better understood via the following examples which illustrate specific and preferred embodiments.

EXAMPLE 1

Samples of a commercially obtained tabular alumina (A) with a particle size range of 45–106 μm (150/325 mesh) were treated with dilute nitric acid solutions of variable concentration ranging from 0.001M to 0.5M. The tests were conducted by slurrying about 25 grams of the alumina powder in 200 cc of acid solution at room temperature for a period of 20 to 30 minutes using a magnetic stirrer to provide continuous agitation. After acid treatment, the alumina samples were collected in a small Buchner funnel and briefly rinsed with about 30–50 cc of deionized water. A control test, for comparative purposes, was also carried out using deionized water in place of nitric acid. After filtration, the alumina samples were dried at room temperature and then dried overnight in a vacuum oven maintained at 100° C.

Each of the acid washed materials was tested for sintering resistance in a small fixed bed sintering test developed to assess the agglomeration resistance of particulate oxides in fluid bed syn gas generation. In this test, an 8–10 gram sample of the particulate oxide was distributed in a small Coors alumina boat. The sample was placed in a high temperature Lindberg furnace and heated from room temperature to 1600° C. over a period of about 90 minutes. The sample was then held at 1600° C. for a period of 2 hours to induce thermal sintering and agglomeration. The sample was then cooled to about 100° C. over a period of 6–12 hours and removed from the oven. The sample was then transferred to a sonic sieve operated at a constant power level, and the conversion of 45 to 106 μm particles to fused aggregates greater than 106 μm in size was determined by weighing the fractions collected on a 150 mesh size screen.

Table 1 compares agglomeration results for the tabular alumina materials treated with nitric acid at variable concentrations. Clearly, very dilute, 0.001M nitric acid and/or washing with deionized water had little or no measurable impact on agglomeration resistance. However, treatment with more concentrated nitric acid solutions resulted in significant improvements in agglomeration resistance. Concentrations in the range of 0.1 to 0.5M provided optimum results.

EXAMPLE 2

The surface compositions of the materials considered in the preceding were investigated using X-ray photoelectron spectroscopy in a conventional instrument manufactured by Leybold-Heraeus that employs an Al-anode X-ray source. The surface atomic ratios of various impurity elements relative to aluminum were calculated by correcting the measured boron(1s) silicon(2s), sodium(1s), calcium(2p), and aluminum(2s) XPS peak areas with Scofield photoionization cross sections. Table 1 includes these atomic ratios for the materials studied. It is apparent that the acid washed materials with improved agglomeration resistance displayed reduced surface concentrations of impurity species. Boron, calcium, silicon, and sodium, in particular, were reduced to low levels after treatment with 0.1–0.5M nitric acid.

a spherical fused low density alpha alumina produced by the same supplier (C), a fused high purity magnesium oxide manufactured by another commercial supplier (D), and a tabular magnesium aluminate manufactured by yet another commercial supplier (E). All of the specimens were sized to 150/325 mesh prior to investigation. These materials were tested for agglomeration and the results are summarized in Table 2. XPS results are also included where such data exist. In all cases, it can be seen that nitric acid treatment resulted in improved agglomeration resistance. It can also be seen that acid treatment resulted in removal of surface impurities.

TABLE 1

Agglomeration Test Data and Surface Composition Results for Acid Treated Tabular Alumina

| Acid Washing Conditions | Agglomeration at 1600° C. (% + 106 μm) | XPS Atomic Ratios | | | |
|---|---|---|---|---|---|
| | | (Na/Al) | (Ca/Al) | (Si/Al) | (B/Al) |
| None (Unwashed Standard) | 47 | 0.10 | 0.012 | 0.034 | 0.046 |
| None (Water Washed Blank) | 44 | 0.12 | 0.012 | 0.034 | 0.051 |
| 0.001 M HNO3 | 59 | 0.077 | 0.014 | 0.035 | 0.040 |
| 0.01 M HNO3 | 16 | 0.059 | 0.009 | 0.021 | 0.035 |
| 0.1 M HNO3 | 14 | 0.039 | 0.009 | 0.020 | 0.032 |
| 0.5 M HNO3 | 11 | 0.014 | 0.009 | 0.016 | 0.009 |

EXAMPLE 3

The agglomeration resistance of several other particulate inorganic oxide solids was investigated after nitric acid treatment as in Example 1 using nitric acid concentration of about 0.5M. The materials studied included a spherical spray dried alpha alumina produced by a commercial supplier (B),

TABLE 2

Agglomeration Test Data and Surface Composition Results for Acid Treated Refractory Oxide Particles

| Material | Pretreat | Agglomeration Data (% + 106 μm) | XPS Atomic Ratios | |
|---|---|---|---|---|
| Spray Dried Alumina (B) | None | 32* | (Na/Al) = 0.12 | (Ca/Al) = 0.025 |
| | 0.5 M HNO3 | 2* | <0.07 | <0.010 |
| Fused low density Alpha Alumina (C) | None | 20** | — | — |
| | 0.5 M HNO3 | 13** | — | — |
| Periclase Magnesium Oxide (E) | None | 31 | (Na/Mg) = 0.065 | (Ca/Mg) = 0.028 |
| | 0.5 M HNO3 | 8 | 0.050 | 0.008 |
| Tabular MgAl2O4 (D) | None | 45 | Na/(Mg + Al) = 0.21 | Ca/(Mg + Al) = 0.015 |
| | 0.5 M HNO3 | 24 | 0.077 | 0.013 |

*agglomeration conducted at 1500° C.
**agglomeration conducted at 1650° C.
otherwise agglomeration tests at 1600° C.

EXAMPLE 4

The structure and morphology of the particulate oxides of Examples 1 and 3, respectively, were also studied using electron microscopy. Judging from the electron micrographs of the untreated and acid treated forms of aluminas A, B, and magnesium aluminate, D, the acid treatments had little or no effect on the particle structure and morphology.

Having described the invention, what is claimed is:

1. In a process for the production of hydrogen and carbon monoxide from a low molecular weight hydrocarbon by contact with a fluidized bed constituted of a catalyst and particulate alpha alumina containing both silicon and boron impurities, at high temperature in the presence of steam, or oxygen, or both steam and oxygen, the improvement wherein the alpha alumina is comprised of particles of alpha alumina the outer peripheral surface layer of which contains no greater than about 5 atom percent silicon and boron, based on the total number of cations within said outer peripheral surface layer, thereby improving resistance to sintering and agglomeration of the fluidized bed, said particles being produced by acid washing of the alpha alumina.

2. The process of claim 1 wherein the boron concentration in the outer peripheral surface layer is below 500 wppm.

3. The process of claim 2 wherein the outer surface layer of the refractory inorganic oxide solids particles contain no greater than about 2 atom percent silicon and boron, based on the total number of cations within said outer surface layer of the particles.

4. The process of claim 2 wherein the alpha alumina contains, as additional impurities besides silicon and boron, any one or all of sodium, iron, and calcium, or titanium where the calcium or titanium is not a primary component of the inorganic oxide matrix constituting the bulk elemental composition of the particle, and the outer surface layer of the particles contain no more than about 20 atom percent impurities based on the sum-total concentration of all of sodium, iron, calcium and titanium as impurities.

5. The process of claim 4 wherein the outer surface layer of the particles contain no more than about 15 atom percent impurities based on the sum-total concentration of all of sodium, iron, calcium and titanium as impurities.

6. The process of claim 2 wherein the alpha alumina was produced by treatment of alpha alumina containing silicon in concentration no greater than about 0.5 percent, based on the total weight of the solids, and boron in concentration no greater than about 500 parts, per million parts by weight of total solids, with an acid.

7. The process of claim 6 wherein the acid used to treat the alpha alumina was one selected from the group consisting of mineral acids, carboxylic acids, amino acids, and sulfonic acids, ranging in concentration from about 0.01 molar to about 2 molar.

8. The process of claim 2 wherein the catalyst is comprised of nickel composited with alpha alumina.

9. The process of claim 8 wherein the alumina component of the catalyst is alpha alumina, and the nickel is composited with the catalyst in concentration ranging from about 1 percent to about 20 percent, based on the weight of the catalyst.

* * * * *